Patented June 9, 1953

2,641,599

UNITED STATES PATENT OFFICE 2,641,599

DIBENZOYLETHYLENE COMPOUNDS AND METHOD FOR PRODUCING THE SAME

Moses Wolf Goldberg, Upper Montclair, and Albert Israel Rachlin, Maywood, N. J., assignors to Hoffmann-La Roche Inc., Nutley, N. J., a corporation of New Jersey No Drawing. Application November 24, 1950, Serial No. 197,491

8 Claims. (Cl. 260—309.6)

The present invention relates to dibenzoylethylene compounds and more particularly to 1-benzoyl-2-[p-(4,5-dihydro-2-imidazolyl)benzoyl]-ethylene, 1-benzoyl-2-(p-quanylbenzoyl)ethylene, the acid addition salts of the aforesaid compounds and the method of producing the same. The new compounds are useful as antitrichomonas compounds.

The 1-benzoyl-2-[p-(4,5-dihydro-2-imidazolyl)benzoyl] ethylene can be represented by the following formula:

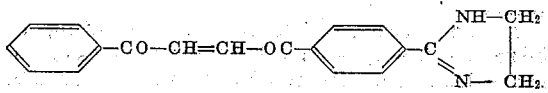

and the 1-benzoyl-2-(p-guanylbenzoyl)ethylene can be represented by the following formula:

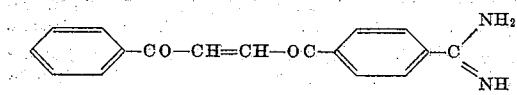

The new compounds can be prepared by reacting a 1-benzoyl-2-[p-(α-iminoalkoxymethyl)benzoyl] ethylene hydrochloride with ethylenediamine to obtain the 4,5-dihydro-2-imidazolyl compounds, and with ammonia to obtain the guanyl compounds. This reaction results in the formation of the hydrochloride salts of the compounds. The free bases are readily obtained on treating the hydrochloride salts with an alkali, such as sodium hydroxide.

The 1-benzoyl-2-[p-(α-iminoalkoxymethyl)-benzoyl]ethylene hydrochlorides are new compounds, and can be prepared by reacting a cold suspension of 1-benzoyl-2-(p-cyanobenzoyl)ethylene in a lower alcohol, such as methanol or ethanol, with an equivalent amount of hydrogen chloride or a small excess thereof. The 1-benzoyl-2-(p-cyanobenzoyl)ethylene can, in turn, be prepared by reacting acetophenone with p-cyanophenylglyoxal, which is prepared by oxidizing p-cyanoacetophenone with selenium oxide.

The following examples will serve to illustrate the preparation of the new intermediates.

EXAMPLE A p-Cyanophenylglyoxal

To a mixture of 500 cc. of dioxane and 20 cc. of water were added 56 grams of finely divided selenium dioxide. The mixture was stirred at 50° C. until the selenium dioxide had dissolved, and then 72.5 grams of p-cyanoacetophenone were added. The mixture was refluxed with stirring for 6 hours, during which time black metallic selenium precipitated. Stirring was continued without heating for 18 hours, and then the selenium was removed by filtration. The solvent was removed in vacuo and the hot residue was dissolved in 300 cc. of acetone. The acetone was flashed off and the residue was distilled on an oil bath. The p-cyanophenylglyoxal was obtained as a heavy, viscous oil boiling at 104–110° C./1.5 mm. A sample of the oily material was converted to the hydrate by trituration with water. After several crystallizations from nitromethane, the white crystalline p-cyanophenylglyoxal hydrate melted at 96–100° C.

EXAMPLE B

1-benzoyl-2-(p-cyanobenzoyl)ethylene

A mixture of 79.4 grams of p-cyanophenylglyoxal, 60 grams of acetophenone, and 56.5 cc. of acetic anhydride was heated for 2.5 hours in an oil bath at 145–150° C. Vacuum was applied to the hot mixture to remove the acetic acid formed, and after standing for 24 hours at room temperature, the mixture was triturated with 30 cc. of absolute ethanol, filtered, and washed twice with 30 cc. of absolute ethanol, and then 30 cc. of ether. The yellow product thus obtained was recrystallized from 2300 cc. of methanol, yielding yellow crystals of 1-benzoyl-2-(p-cyanobenzoyl)ethylene, M. P. 143–145° C.

EXAMPLE C

1-benzoyl-2-[p-(α-iminomethoxymethyl)-benzoyl]ethylene hydrochloride

A stirred suspension of 9 grams of 1-benzoyl-2-(p-cyanobenzoyl)ethylene in 85 cc. of methanol was cooled in an ice bath for 20 minutes. Dry hydrogen chloride was passed into the suspension for 6 minutes. Complete solution resulted 2 minutes after starting the addition of the hydrogen chloride. The solution was allowed to stand at room temperature for 72 hours. Orange-colored crystals began to separate after 2.5 hours of standing at room temperature. After the expiration of 72 hours, the orange-colored crystals were filtered, washed with ether, and dried in vacuo over solid potassium hydroxide. The product was recrystallized several times from ethanol to yield 1-benzoyl-2-[p-(α-iminomethoxymethyl)-benzoyl] ethylene hydrochloride, M. P. 253–255° C.

The following examples will serve to illustrate the preparation of the guanyl and imidazolyl substituted compounds.

EXAMPLE 1

1-benzoyl-2-[p-(4,5-dihydro-2-imidazolyl)-benzoyl]ethylene hydrochloride

A solution of 3.29 grams of 1-benzoyl-2-[p-α-iminomethoxymethyl)benzoyl]ethylene hydrochloride, 27 cc. of methanol and 0.9 gram of anhydrous ethylenediamine was refluxed for 6 hours. The solution was filtered from a small amount of insoluble matter and the filtrate was cooled to 4° C. The crystalline product which formed was filtered off and had a M. P. of 276–279° C. with decomposition. The mother liquor was concentrated to 7 cc. and cooled at 4° C. A second crop of the product having the melting point 269–279° C. with decomposition was obtained. The combined fractions were recrystallized from a mixture of 120 cc. of acetonitrile, one cc. of concentrated hydrochloric acid, and 18 cc. of water, giving a product melting at 278–279° C. with decomposition. When this product was recrystallized from alcohol, pure 1-benzoyl-2-[p-(4,5-dihydro-2-imidazolyl)benzoyl]ethylene hydrochloride was obtained in the form of orange-colored cubes, M. P. 277–279° C. These crystals tend to retain alcohol of crystallization.

The free base, 1-benzoyl-2-[p-4,5-dihydro-2-imidazolyl)benzoyl]ethylene, was obtained from a solution of the hydrochloride by the addition of 0.1 N sodium hydroxide. Recrystallized from ethanol, the free base was obtained in the form of yellow crystals, M. P. 181–183° C.

EXAMPLE 2

1-benzoyl-2-(p-guanylbenzoyl)ethylene hydrochloride 3.5 grams of 1-benzoyl-2-[p-(α-iminomethoxymethyl)benzoyl]ethylene hydrochloride and 50 cc. of methanolic ammonia (11 per cent) were heated at 70° C. in a pressure bottle for 6 hours. After cooling to room temperature, a small amount of insoluble matter was removed by filtration, and the mother liquor was evaporated to dryness in vacuo. The residue was recrystallized from a mixture of 180 cc. of acetonitrile, 3 cc. of concentrated hydrochloric acid, and 22 cc. of water, yielding 1-benzoyl-2-(p-guanylbenzoyl)-ethylene hydrochloride as orange-colored crystals, M. P. 252–253° C. A sample of this compound recrystallized from acetonitrile - water melted at 253–255° C.

The free base, 1-benzoyl-2-(p-guanylbenzoyl)-ethylene, can be liberated from a solution of the hydrochloride by the addition of 0.1 N sodium hydroxide.

We claim:

1. A compound selected from the group consisting of 1 - benzoyl - 2 - [p - (4,5 - dihydro - 2-imidazolyl)benzoyl]ethylene and 1-benzoyl-2-(p-guanylbenzoyl)-ethylene, and the acid addition salts thereof.

2. 1 - benzoyl - 2 - (p - guanylbenzoyl)ethylene hydrochloride.

3. 1 - benzoyl - 2 - (p - guanylbenzoyl)ethylene.

4. 1 - benzoyl - 2 - [p - (4,5 - dihydro - 2-imidazolyl)benzoyl]ethylene hydrochloride.

5. 1-benzoyl-2-[p-(4,5 - dihydro-2-imidazolyl)-benzoyl]ethylene.

6. The process which comprises reacting a cooled suspension of 1 - benzoyl - 2 - (p - cyanobenzoyl)ethylene in a lower alcohol with approximately an equivalent amount of hydrogen chloride so as to produce a 1-benzoyl-2-[p-(α-iminoalkoxymethyl)benzoyl]ethylene hydrochloride, and reacting the latter compound with a member of a group consisting of ammonia and ethylenediamine.

7. The process which comprises reacting 1-benzoyl - 2 - [p - (α - iminomethoxymethyl)-benzoyl]ethylene hydrochloride with ammonia so as to form 1-benzoyl-2-(p-guanylbenzoyl)-ethylene hydrochloride.

8. The process which comprises reacting 1-benzoyl - 2 - [p - (α - iminomethoxymethyl)-benzoyl]ethylene hydrochloride with ethylenediamine to form 1-benzoyl-2-[p-(4,5-dihydro-2-imidazolyl)benzoyl]ethylene hydrochloride.

MOSES WOLF GOLDBERG.
ALBERT ISRAEL RACHLIN.

No references cited.